(12) United States Patent
Yamanaka et al.

(10) Patent No.: US 6,366,428 B1
(45) Date of Patent: Apr. 2, 2002

(54) THIN FILM MAGNETIC HEAD, A MAGNETIC HEAD DEVICE AND A MAGNETIC DISK DRIVING DEVICE

(75) Inventors: Noboru Yamanaka; Mikio Ohmori; Youichi Suzuki; Izumi Nomura, all of Chuo-ku (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/610,677

(22) Filed: Jul. 7, 2000

(30) Foreign Application Priority Data

Jul. 19, 1999 (JP) .......................... 11-205414
Jun. 2, 2000 (JP) .......................... 12-166623

(51) Int. Cl.$^7$ .............................................. G61B 5/147
(52) U.S. Cl. .................................... 360/126; 360/317
(58) Field of Search .................... 360/234.3, 334.4, 360/234.5, 234.6, 234.7, 234.8, 324.9, 235.4, 236.8, 126, 317

(56) References Cited

U.S. PATENT DOCUMENTS

| | | | | |
|---|---|---|---|---|
| 5,621,596 A | * | 4/1997 | Santini | 360/126 |
| 5,649,351 A | * | 7/1997 | Cole et al. | 29/603.14 |
| 5,793,578 A | * | 8/1998 | Heim et al. | 360/126 |
| 5,798,897 A | * | 8/1998 | Chang et al. | 360/126 |
| 5,822,153 A | * | 10/1998 | Lairson et al. | 360/104 |
| 5,850,325 A | * | 12/1998 | Miyauchi et al. | 360/113 |
| 6,181,514 B1 | * | 1/2001 | Santini et al. | 360/126 |
| 6,317,291 B1 | * | 11/2001 | Iwai et al. | 360/126 |

FOREIGN PATENT DOCUMENTS

JP   A-4-366408   12/1992

* cited by examiner

*Primary Examiner*—David L. Ometz
*Assistant Examiner*—Dzung C. Nguyen
(74) *Attorney, Agent, or Firm*—Oliff & Berridge, PLC

(57) ABSTRACT

An inner gap in between the first and the second magnetic films is embedded by an insulating film, on which the second magnetic film is formed. The coil film is embedded in the insulating film. An inductive type electromagnetic conversion element is covered with a protection film entirely. Provided that the minimum thickness on the second magnetic film of the protection film is "A" and the maximum thickness in the inner gap of the insulating film is "B", the relation of "$1 \leq (A/B) \leq 2.5$" is satisfied.

17 Claims, 12 Drawing Sheets

THIN FILM MAGNETIC HEAD, A MAGNETIC HEAD DEVICE AND A MAGNETIC DISK DRIVING DEVICE

BACKGROUND OF THE INVENTION

1) Field of the Invention

This invention relates to a thin film magnetic head, a magnetic head device and a magnetic disk driving device.

Related Art Statement

A floating type thin film magnetic head has usually an inductive type electromagnetic conversion element as a writing element and a magnetoresistive effective element as a reading element in an air outflow side of its slider. The inductive type electromagnetic conversion element is covered with a protection film which is made of an inorganic insulating material such as alumina and constitutes an outermost surface layer of the magnetic head in the air outflow side.

The inductive type electromagnetic conversion element includes a first and a second magnetic films, a gap film, a coil film and an insulating film, etc. The edge portions of the first and second magnetic films, which are opposed each other via the gap film in the air bearing side (hereinafter, called as "ABS") of the slider, constitutes a pole portion for writing.

Moreover, the second magnetic film rises up with inclination of a given angle on the gap film, extending backward from the ABS with maintaining a minute space for the first magnetic film, and is joined with the first magnetic film.

The coil film passes through the space (inner gap) in between the first and the second magnetic films and winds spirally around a backward joined portion between the first and the second magnetic films. Both ends of the coil film are drawn out to the outside via a terminal conductor(bump). The inner gap in between the first and the second magnetic films is embedded by the insulating film. The coil film is embedded in the insulating film. The second magnetic film is formed on the insulating film.

In writing for a magnetic disk by the above thin film magnetic head, a current for writing is supplied to the coil film of the inductive type electromagnetic conversion element.

In this case, however, the coil film develop a heat. As mentioned above, since the coil film is embedded in the insulating film made of an organic insulating material, and the insulating film is covered with the protection film made of alumina, etc., the coil film can not discharge the heat effectively. Therefore, the developed heat is charged in the thin film magnetic head, and thus, expands the insulating film thermally.

The thermally expanded insulating film presses and expands the protection film to the outside. The expansion of the protection film influences the ABS, resulting in the expansion of the part of the ABS corresponding to the inductive type electromagnetic conversion element. Moreover, the developed heat in the coil film expands the first and the second magnetic films adjacent to the insulating film thermally. As a result, the edge of the pole portion, not much strongly fixed, composed of the first and the second magnetic films is expanded in the ABS side. The expansion degree often reaches 10 nm.

In a magnetic disk driving device having such a thin film magnetic head, for high recording density, the floating space between the ABS of the thin film magnetic head and a magnetic disk is narrowed gradually to 40 nm, 30 nm, 20 nm or 10 nm. Therefore, the above expansion in the ABS can easily crash the thin film magnetic head itself and the magnetic disk or damage the magnetic recorded data, resulting in the deterioration of the reliability of the magnetic disk driving device.

For solving the problem, Kokai Publication Kokai Hei 4-366408 (JP A 4-366408) discloses that a recessed portion is formed on the surface of a protection film in a medium opposing surface. The recessed portion is so formed that the surface of the protection film is polished flat with heating the thin film magnetic head element and thereby, expanding the protection film.

However, the disclosed technique dose not repress the thermal expansion of the protection film, but allows the thermal expansion as far as the protection film does not expands beyond the flat ABS by retreating the protection film from the ABS in advance. Therefore, the disclosed technique can not solve the above problem.

Moreover, in the above technique, the complicate process is required that the protection film is flattened on the basis of the assumed expansion degree due to the developed heat at a recording operation. In addition, the configuration of the slider, particularly the geometrical shape of the ABS is specified to a give shape, and thus, the ABS can not have another geometrical shape for improving the floating performance. Then, in the above technique, a means to repress the thermal expansion of the edge of the pole portion is not disclosed.

SUMMARY OF THE INVENTION

It is an object of the present invention to provide a thin film magnetic head in which the thermal expansion in the ABS due to the developed heat at a recording operation can be repressed.

It is another object of the present invention to provide a thin film magnetic head in which the thermal expansion in the ABS due to the developed heat at a recording operation can be repressed absolutely without a special manufacturing step.

It is further object of the present invention to provide a thin film magnetic head in which the thermal expansion of the edge of the pole portion as well as the protection film can be repressed absolutely.

For achieving the above objects, a thin film magnetic head of the present invention includes a slider, at least one inductive type electromagnetic conversion element and a protection film.

The inductive type electromagnetic conversion element includes a first magnetic film, a second magnetic film, a gap film, a coil film and an insulating film which are supported by the slider. The forefronts of the first and the second magnetic films in the ABS of the slider are opposed each other via the gap film, and thereby, constitutes the pole portion of the thin film magnetic head.

The first magnetic film is extended backward from the pole portion on the basis of the ABS. The second magnetic film is extended backward from the pole portion on the basis of the ABS with maintaining a minute space for the first magnetic film, and is joined with the first magnetic film.

The space (inner gap) in between the first and the second magnetic films is embedded by the insulating film, on which the second magnetic film is formed. The coil film is embedded in the insulating film, and wound spirally around the backward joined portion between the first and the second magnetic films. The inductive type electromagnetic conversion element is covered with the protection film entirely.

Herein, provided that the minimum thickness on the second magnetic film of the protection film is "A" and the maximum thickness between the inner space of the insulating film is "B", the relation of "$1 \leq (A/B) \leq 2.5$" is satisfied.

As mentioned above, in the thin film magnetic head of the present invention, the forefronts of the first and the second magnetic films in the ABS of the slider are opposed each other via the gap film, and thereby, constitutes the pole portion of the thin film magnetic head. Moreover, the second magnetic film is extended backward from the pole portion on the basis of the ABS with maintaining a minute space for the first magnetic film, and is joined with the first magnetic film. Therefore, a thin film magnetic circuit with the pole portion for writing in the ABS side is composed of the first and the second magnetic films and the gap film.

Moreover, the coil film passes through the space (inner gap) in between the first and the second magnetic films and winds around the backward joined portion between the first and the second magnetic films. Therefore, when a current for writing is flown in the coil film, a magnetic flux for writing is generated in the thin film magnetic circuit composed of the first and the second magnetic films and the gap film, thereby, a magnetic field for writing is generated at the edge of the pole portion. A magnetic disk can be magnetically recorded by the magnetic field.

Since the coil film is embedded in the insulating film and the second magnetic film is provided on the insulating film, it is electrically insulated from the first and the second magnetic films. Moreover, the whole inductive type electromagnetic conversion element is covered with the protection film.

Moreover, in this invention, the minimum thickness A on the second magnetic film of the protection film and the maximum thickness B between the inner gap of the insulating film satisfy the relation of $1 \leq (A/B) \leq 2.5$. Therefore, the expansion degree of the protection film can be repressed to 3 nm or below. As a result, even though the floating space between the thin film magnetic head and the magnetic disk is narrowed to 40 nm, 30 nm, 20 nm or the like, the magnetic head and the magnetic disk are not crashed and the magnetically recorded data are not damaged, so that the reliability of the thin film magnetic head can be developed.

According to the present invention, the thermal expansion of the protection film due to the developed heat at a recording operation can be repressed by selecting the minimum thickness A on the second magnetic film of the protection film and the maximum thickness B between the inner gap of the insulating film without a special manufacturing step. As a result, the thermal expansion of the edge of the pole portion as well as the protection film can be repressed.

This invention relates to a magnetic head device and a magnetic disk driving device which have the above thin film magnetic head.

The other objects, configurations and advantages will be explained in detail, with reference to the attaching drawings in embodiments.

BRIEF DESCRIPTION OF THE DRAWINGS

For a better understanding of this invention, reference is made to the attached drawings, wherein.

DETAILED DESCRIPTION OF PREFERRED EMBODIMENTS

Figure 1:
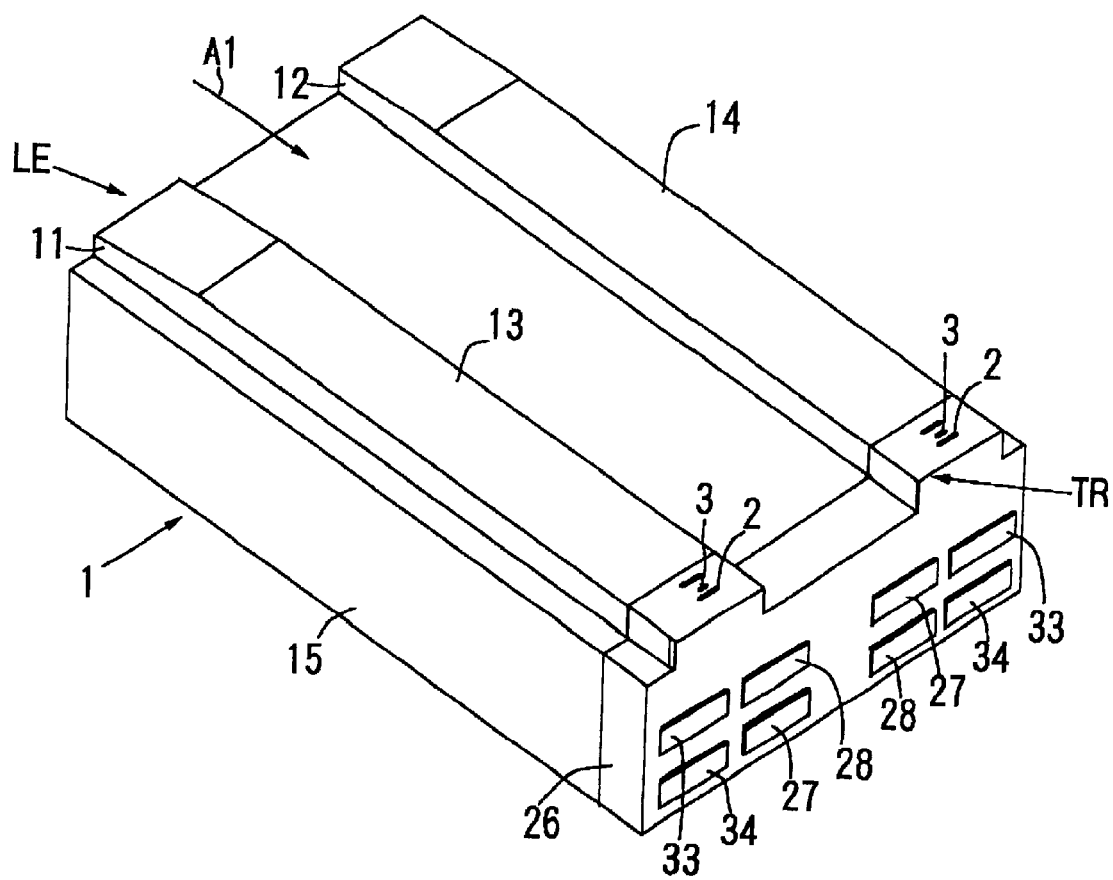
FIG. 1 is a perspective view showing a thin film magnetic head according to the present invention.
Figure 2:
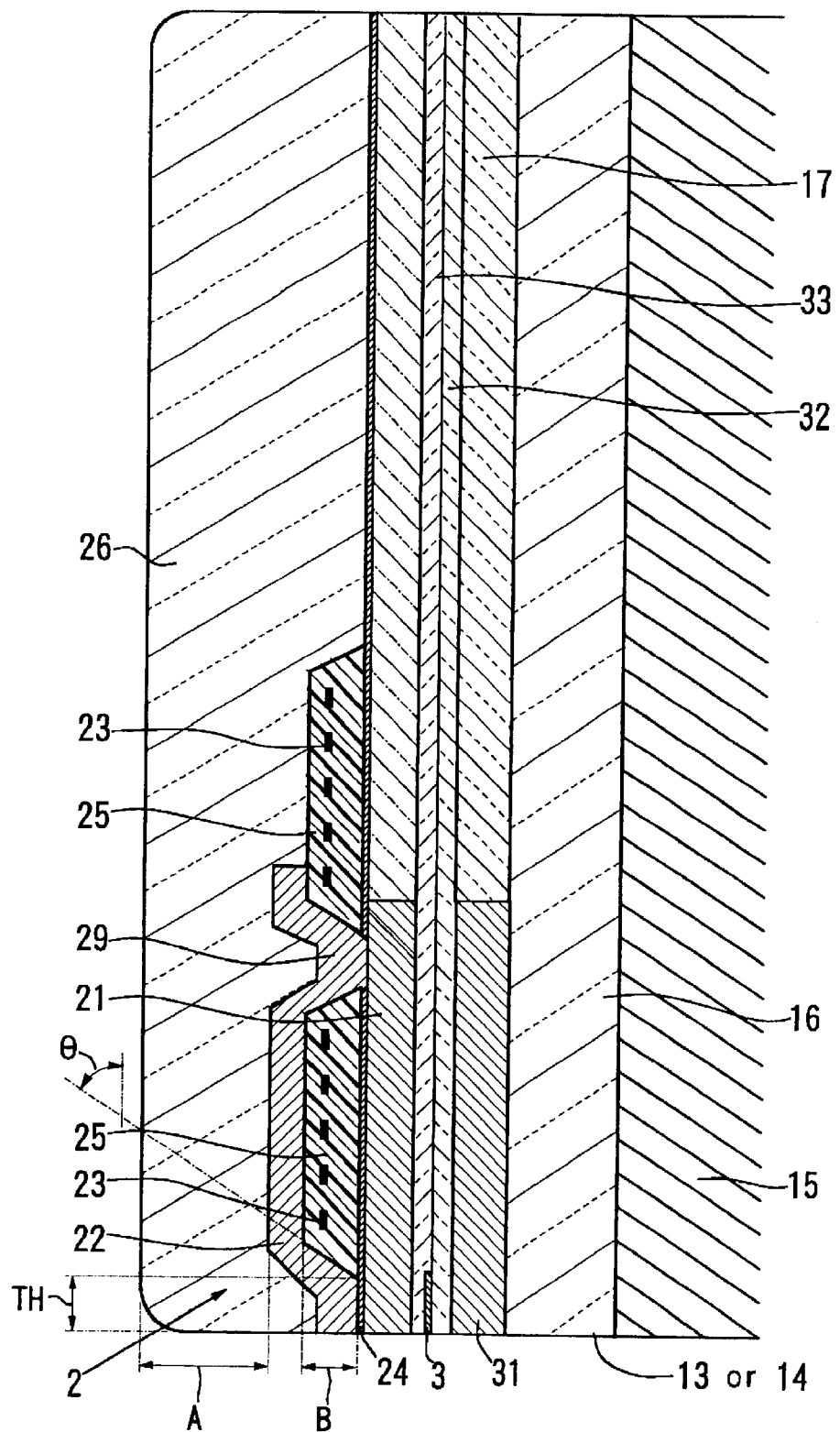
FIG. 2 is a cross sectional view, taken on line "2—2"

FIG. 1 is a perspective view showing an example in the thin film magnetic head of the present invention, and FIG. 2 is an enlarged cross sectional view of the thin film magnetic head shown in FIG. 1. In FIG. 2, some parts are depicted exaggeratedly.

The illustrated thin film magnetic head includes a slider 1, two inductive type electromagnetic conversion elements 2 and two magneto-resistive effective elements 3 (hereinafter, called as "MR element"s). The slider 1 has rail parts 11 and 12 on its medium opposing surface, and the surfaces of the rail parts 11 and 12 are employed as ABSs 13 and 14. The slider 1 is not required to have the two rail parts 11 and 12. For example, it may have one to three rail parts or a flat surface without the rail. For improving its floating performance, the slider 1 may have rail parts with geometrical shapes. This invention can be applied for any kind of slider.

The slider 1 can have a protection film with a thickness of 8–10 nm made of DLC on the rail parts, and in this case, the ABSs 13 and 14 are composed of the surface of the protection film. The slider 1 is a ceramic structural body having a substrate 15 made of $Al_2O_3$—TiC or the like and an inorganic insulating film 16 made of $Al_2O_3$, $SiO_2$ or the like on the substrate 15.

The inductive type electromagnetic conversion element 2 functions as a writing element, and the MR element 3 functions as a reading element. The inductive type electromagnetic conversion elements 2 and the MR elements 3 are provided on both of the end surfaces of the rail parts 11 and 12 in an air outflow edge (trailing edge) TR. However, the inductive type electromagnetic conversion elements and the MR elements may be provided on either end surface of the rail part 11 or 12. The edge portions for electromagnetic conversion of the inductive type electromagnetic conversion elements 2 and the MR elements 3 which are provided on the slider 1 are located near the ABSs 13 and 14. On the end surface of the thin film magnetic head in the air outflow edge TR are provided pull-out electrodes 27 and 28 connected to the inductive type electromagnetic conversion elements 2 and pull-out electrodes 33 and 34 connected to the MR elements 3, respectively.

The inductive type electromagnetic conversion element 2 has a first magnetic film 21 doubling as a second shielding film for the MR element 3, a second magnetic film 22, a coil film 23, a gap film 24 made of alumina, etc., an insulating film 25 and a protection film 26. The second shielding film may be provided independently.

The forefronts of the first and the second magnetic films 21 and 22 are opposed each other via the gap film 24 with a minute thickness, and thereby, constitute a pole portion for writing. The first and the second magnetic films 21 and 22 have single layered structure or multi-layered structure. The multi-layered first and second magnetic films may improve the performance of the thin film magnetic head. In view of the narrowing of track width and the development of recording performance, various pole portion structures are suggested up to now. This invention can be applied for any kind of pole portion structure. The gap film 24 is made of an inorganic insulating material such as a non-magnetic metal or alumina.

The second magnetic film 22 rises up with inclination of a given angle θ from the gap film 24. The rising angle θ corresponds to an Apex Angle, and the distance between the forefront of the pole portion and the rising start point corresponds to a Throat Height TH. The Apex Angle θ and the Throat Height TH influence the electromagnetic conversion properties of the thin film magnetic head.

The second magnetic film 22 is extended backward from the ABSs 13 and 14 with maintaining the inner gap for the first magnetic film 21, and is joined with the first magnetic film 21 at a backward joining portion 29. Thereby, a thin film magnetic circuit composed of the first and the second magnetic films 21 and 22 and the gap film 24 is completed.

The coil film 23 is located between the first and the second magnetic films, and is wound spirally around the backward joining portion 29. Both ends of the coil film 23 are conductively connected to the pull-out electrodes 27 and 28 (see, FIG. 1). The winding number and layer number of the coil film 23 are not limited.

The insulating film 25 is composed of an organic insulating resin film or ceramic film such as $Al_2O_3$ or $SiO_2$, and is charged in the inner gap between the first and the second magnetic films 21 and 22. The coil film 23 is embedded in the insulating film 25. The second magnetic film 22 is provided on the insulating film 25. The upper surface of the insulating film 25 rises up at the Apex Angle θ at the remote position from the forefront of the pole portion by the Throat Height TH, and thus, the insulating film 25 does not have a constant thickness in the inner gap. Herein, the maximum thickness of the insulating film 25 in the inner gap is designated by "B".

The protection film 26 covers the inductive type electromagnetic conversion element 2 entirely, and has the minimum thickness A of 6–50 μm between the second magnetic film 22 and the outer surface of the protection film. The minimum thickness A means the minimum thickness of the protection film on the basis of the variable surface of the second magnetic film 22. The protection film 26 is made of an inorganic insulation material such as $Al_2O_3$ or $SiO_2$.

In this invention, the minimum thickness A on the second magnetic film 22 of the protection film 26 and the maximum thickness B in the inner gap of the insulating film 25 are so selected that the relation of $1 \leq (A/B) \leq 2.5$ is satisfied.

As the MR element, various film structures have been proposed and practically used. For example, an anisotropic magnetoresistive (IMR) effective element made of permalloy, an element with a giant magnetoresistive (GMR) effective film such as a spin valve film structure or a perovskite type magnetic substance, or a tunnel connection magnetoresistive (TMR) effective element are exemplified. In this invention, any kind of the above film structures may be employed. The MR element 3 is placed, between a first shield film 31 and the first magnetic film 21 doubling as a second shield film, in an insulating film 32. The insulating film 32 is made of alumina, etc. The MR element 3 is connected to the pull-out electrodes 33 and 34 (see, FIG. 1).

As mentioned above, in the thin film magnetic head of the present invention, the forefronts of the first and the second magnetic films 21 and 22 included in the inductive type electromagnetic conversion element 2 are opposed via the gap film 24 in the ABSs 13 and 14 of the slider 1, and thereby, constitute the pole portion. Then, the second magnetic film 22 is extended backward from the ABSs 13 and 14, and is joined with the first magnetic film 21 at the backward joining portion 29. Therefore, a thin film magnetic circuit with the pole portion for writing in the ABSs 13 and 14 is composed.

Moreover, the second magnetic film 22 is extended backward from the ABSs 13 and 14 with maintaining its maximum thickness B in the inner gap for the first magnetic film 21. The coil film 23 passes through the inner gap in between the first and the second magnetic films 21 and 22, and winds spirally around the backward joining portion 29. Therefore, when a current for writing is flown in the coil film 23, a magnetic flux is generated in the thin film magnetic circuit composed of the first and the second magnetic films 21 and 22 and the gap film 24, so that a magnetic field for writing is generated at the edge of the pole portion. A magnetic disk is magnetically recorded by the magnetic field for writing.

Since the second magnetic film 22 rises up with inclination of a given angle θ on the gap film 24, the rising start point determines the Throat Height TH and the Apex Angle θ for electromagnetic conversion properties.

Since the coil film 23 is embedded in the insulating film 25, and the second magnetic film 22 is provided on the insulating film 25, the coil film 23 is electrically insulated from the first and the second magnetic films 21 and 22. The inductive type electromagnetic conversion element 2 is covered with the protection film 26.

Figure 3:
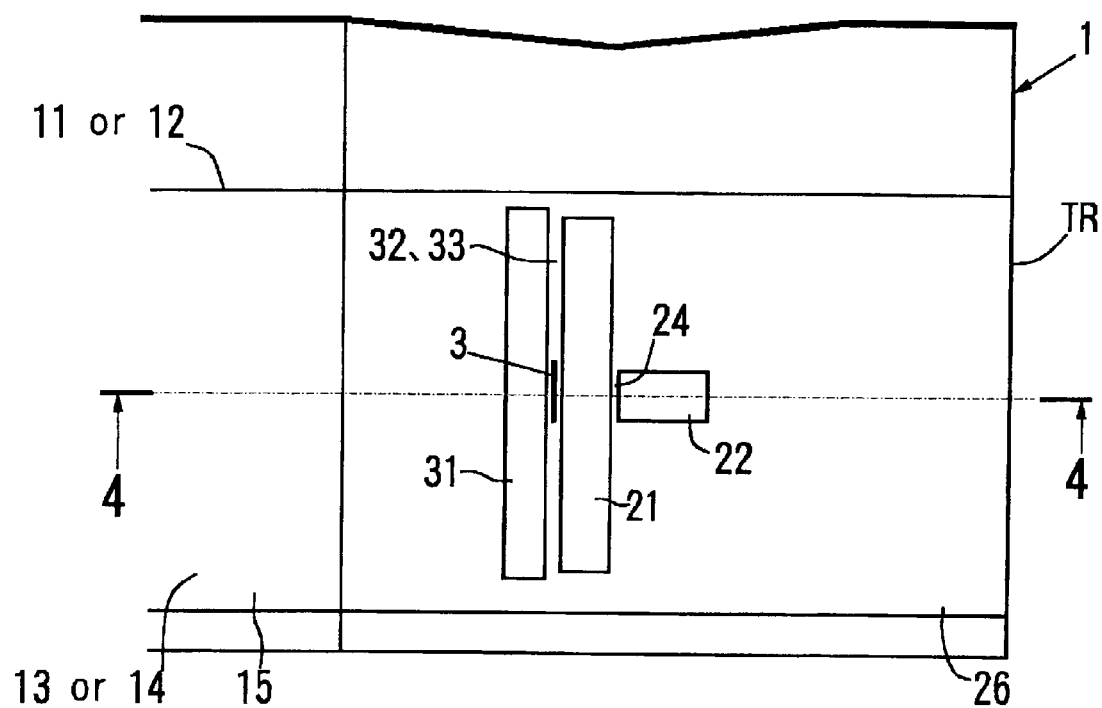
FIG. 3 is an enlarged view of the rail part of the thin film magnetic head shown in FIG. 1.
Figure 4:
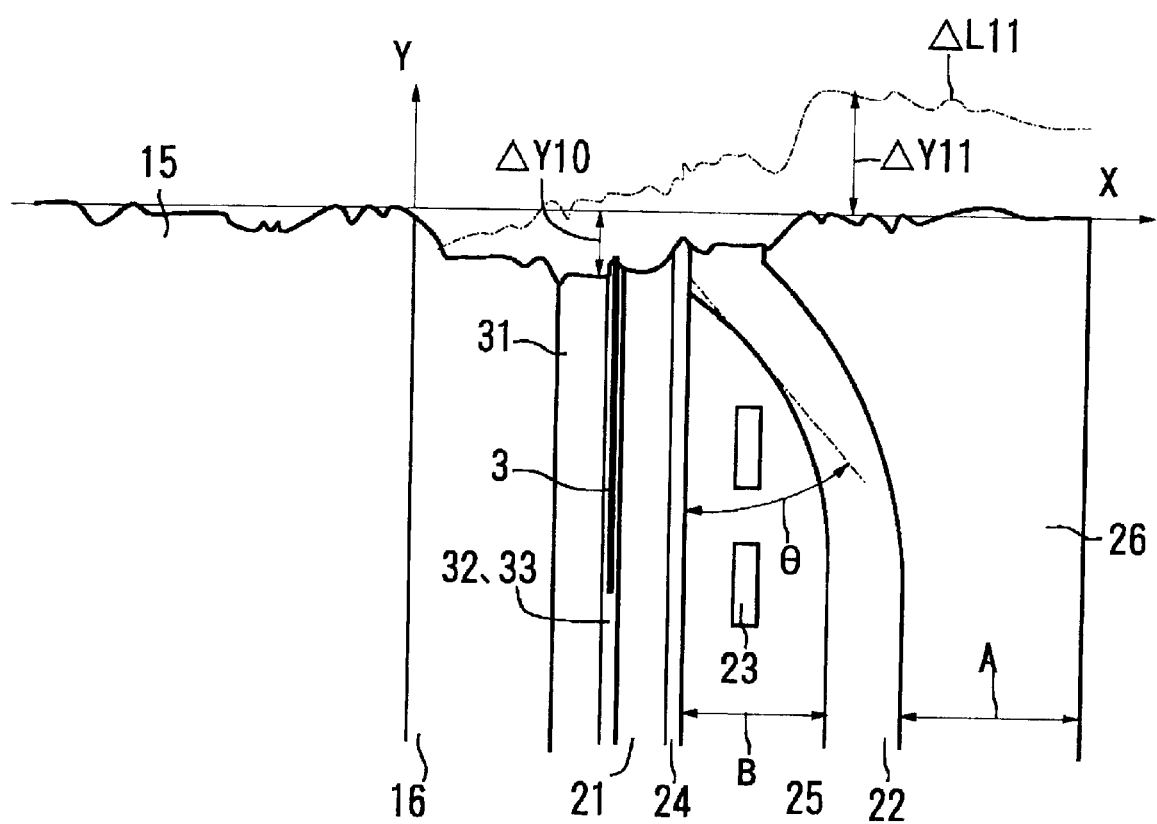
FIG. 4 is a cross sectional view, taken on line "4—4"
Figure 5:
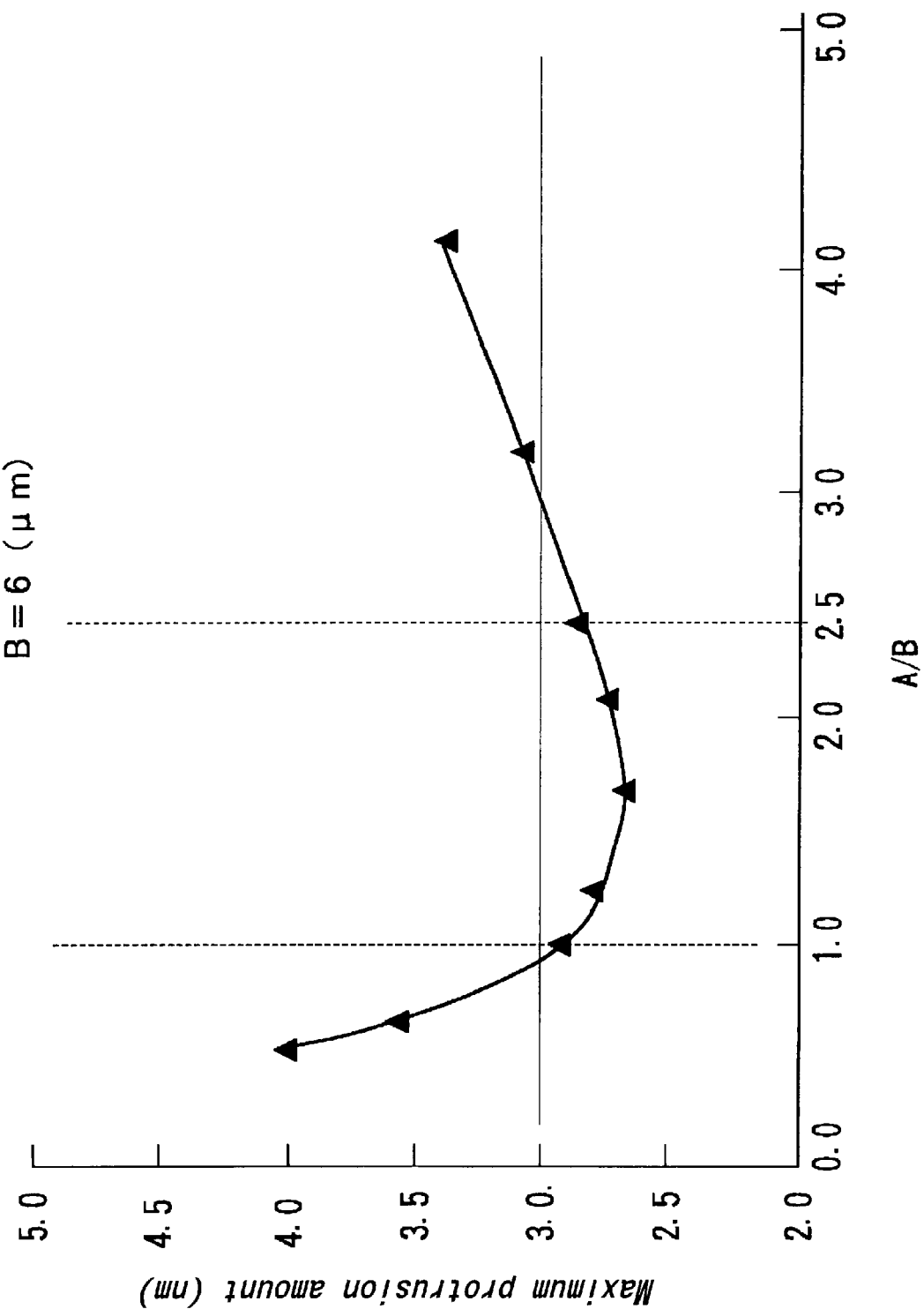
FIG. 5 is a graph exhibiting the simulation data in the relation between the ratio (A/B) of the minimum thickness A of a protection film to the maximum thickness B of an insulating film and the maximum protrusion amount (nm) at the maximum thickness B=6 $\mu$m.
Figure 6:
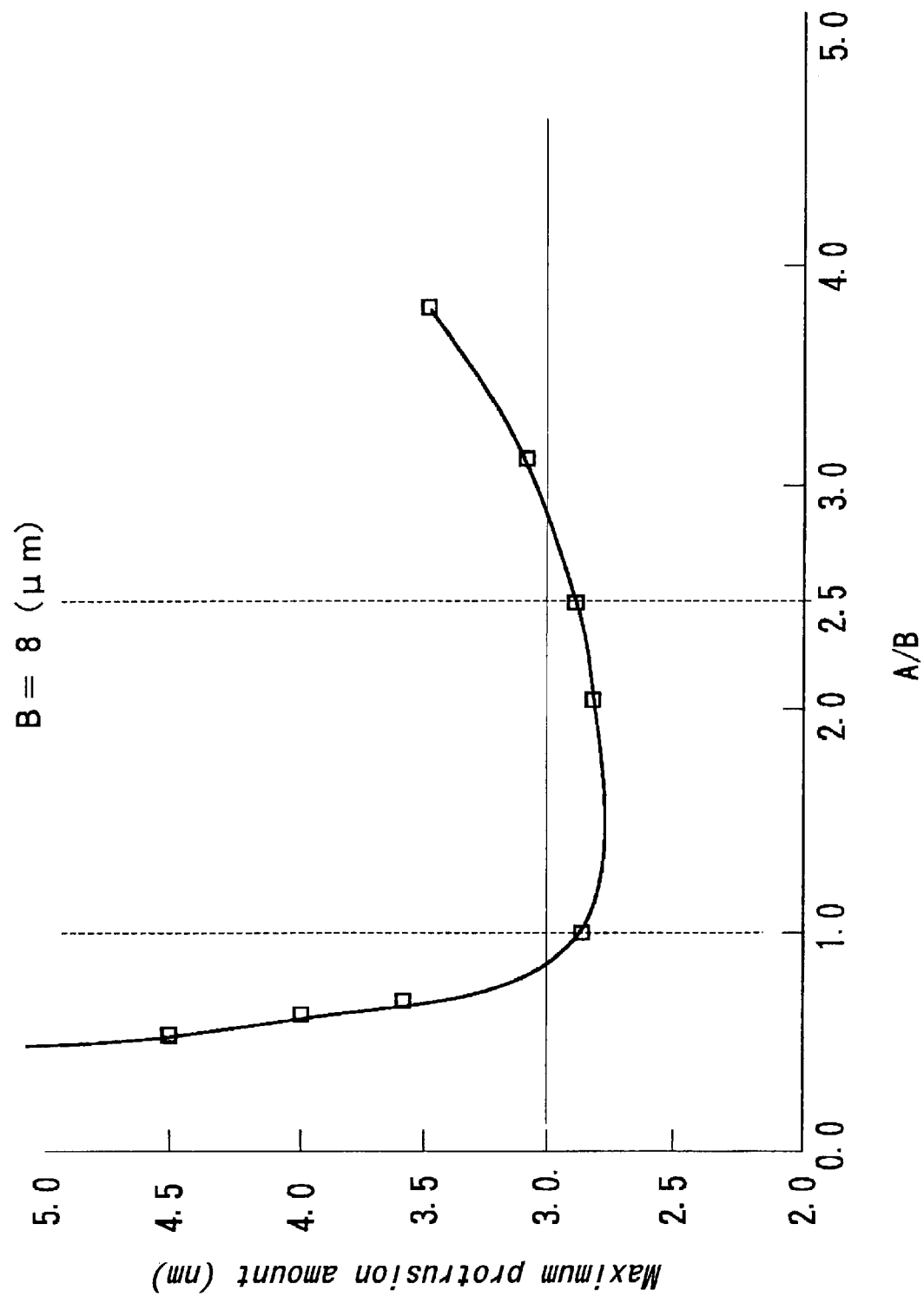
FIG. 6 is a graph exhibiting the simulation data in the relation between the ratio (A/B) of the minimum thickness A of a protection film to the maximum thickness B of an insulating film and the maximum protrusion amount (nm) at the maximum thickness B=8 $\mu$m.
Figure 7:
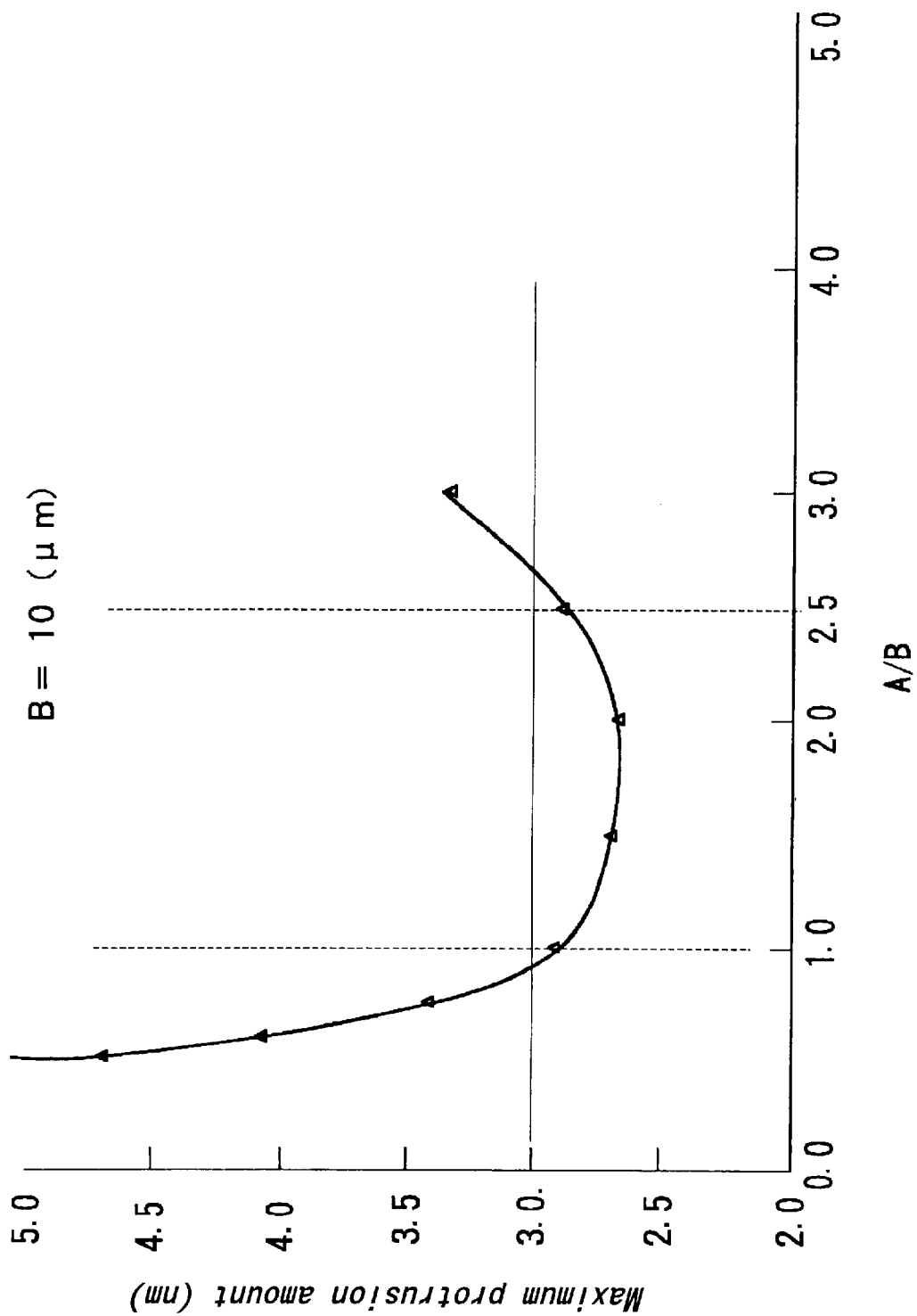
FIG. 7 is a graph exhibiting the simulation data in the relation between the ratio (A/B) of the minimum thickness A of a protection film to the maximum thickness B of an insulating film and the maximum protrusion amount (nm) at the maximum thickness B=10 $\mu$m.
Figure 8:
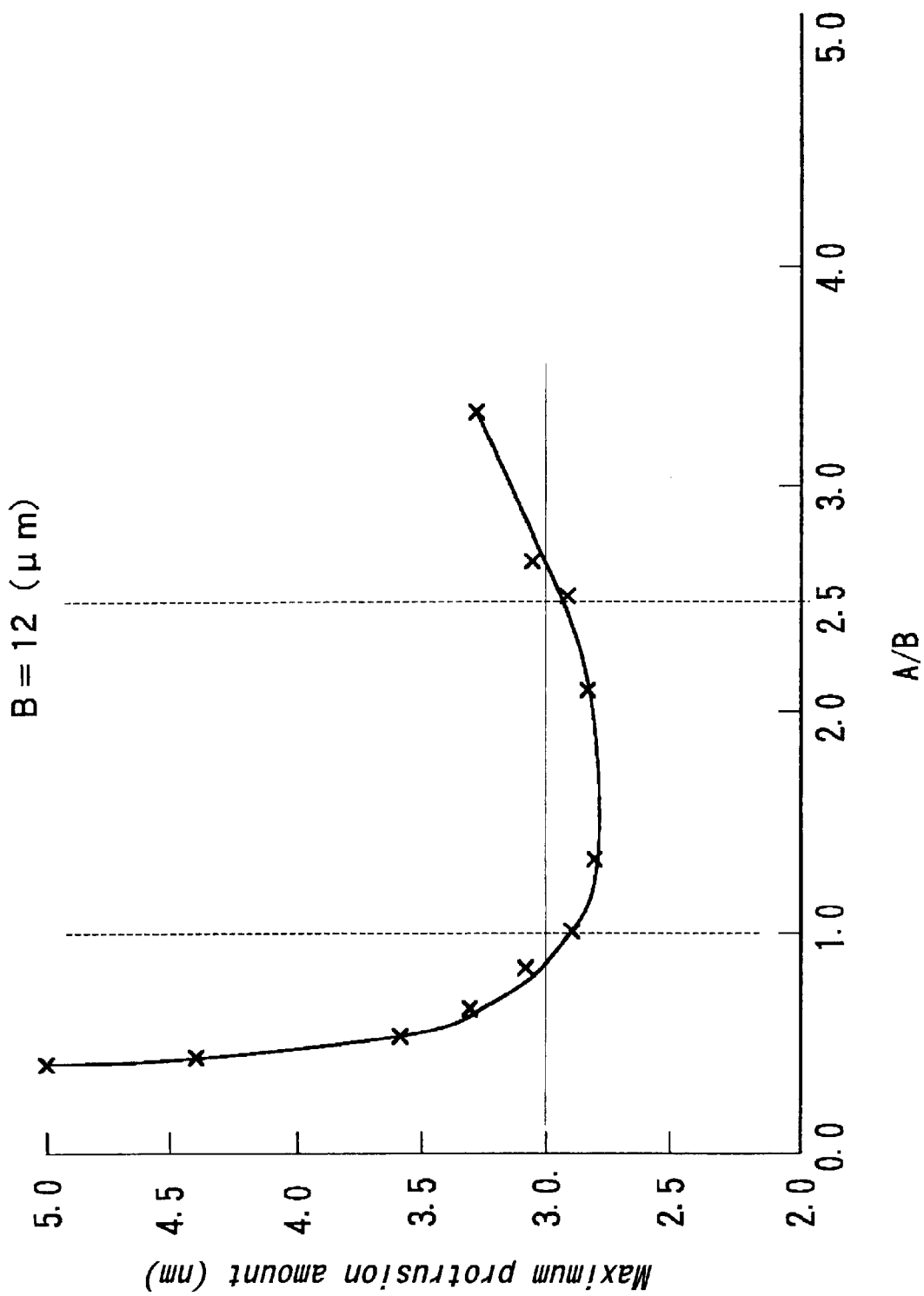
FIG. 8 is a graph exhibiting the simulation data in the relation between the ratio (A/B) of the minimum thickness A of a protection film to the maximum thickness B of an insulating film and the maximum protrusion amount (nm) at the maximum thickness B=12 $\mu$m.
Figure 9:
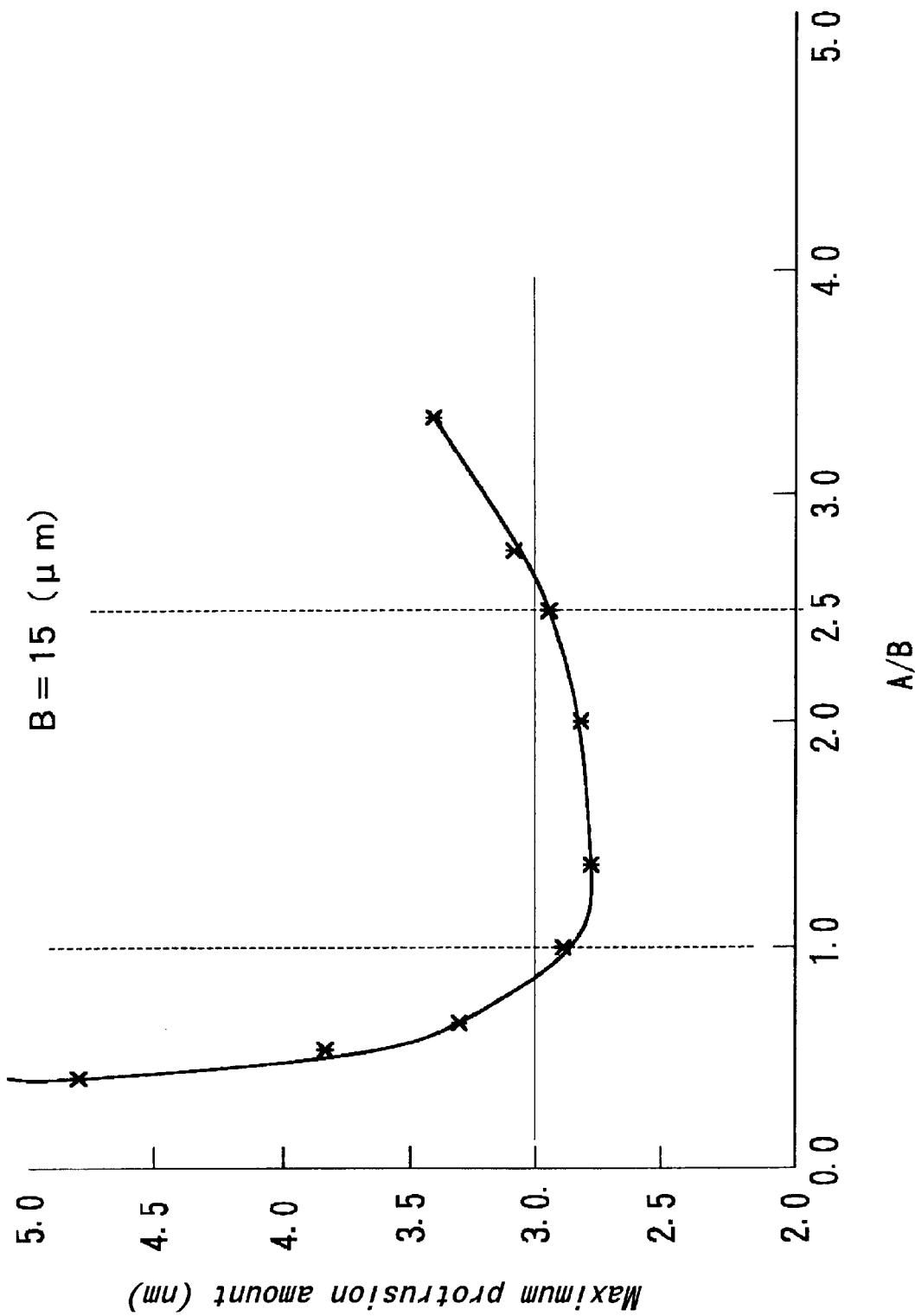
FIG. 9 is a graph exhibiting the simulation data in the relation between the ratio (A/B) of the minimum thickness A of a protection film to the maximum thickness B of an insulating film and the maximum protrusion amount (nm) at the maximum thickness B=15 $\mu$m.
Figure 10:
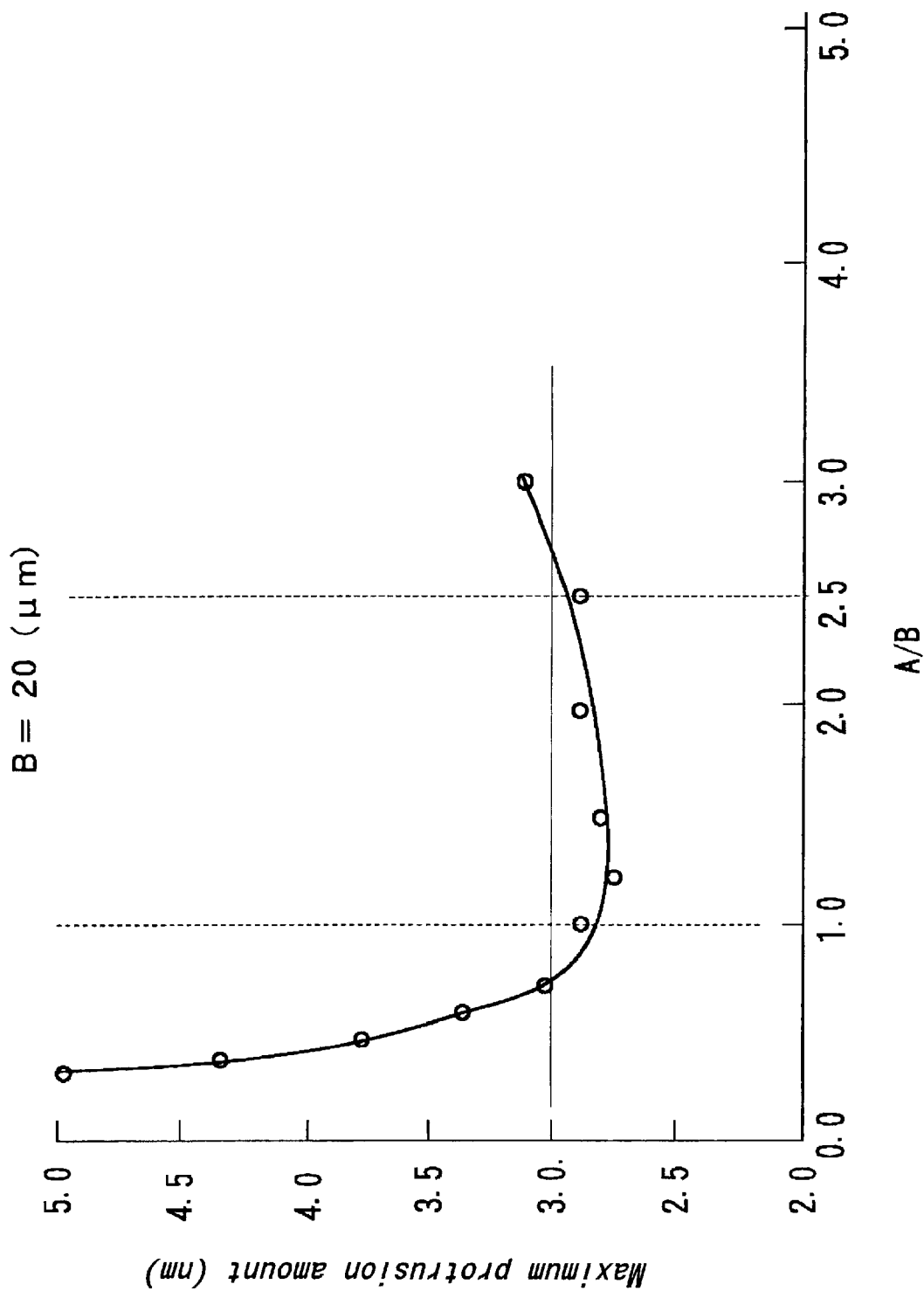
FIG. 10 is a graph exhibiting the simulation data in the relation between the ratio (A/B) of the minimum thickness A of a protection film to the maximum thickness B of an insulating film and the maximum protrusion amount (nm) at the maximum thickness B=20 $\mu$m.

FIG. 3 is an enlarged view of the rail part of the thin film magnetic head, and FIG. 4 is a cross sectional view, taken on line "4—4". The axis "X" designates a standard line alongside the almost surface of the substrate 15 constituting the slider 1, and the axis "Y" designates a standard line alongside the boundary between the substrate 15 constituting the slider 1 and the insulating film 16. FIG. 4 represents the state of the thin film magnetic head in which its surface to be the ABS is polished. The slider 1 is very hard because the substrate 15 constituting the slider 1 is made of $Al_2O_3$—TiC, etc. On the contrary, the first and the second magnetic films 21 and 22 and the first shielding film 31 are made of much softer metallic materials than the $Al_2O_3$—TiC. As well, the gap film 24 is made of a much softer non-magnetic metallic material. Therefore, as shown in FIG. 4, the surfaces of the first and the second magnetic films 21 and 22, the first shielding film 31 and the gap film 24 are depressed by ΔY10 from the standard line X taken on the surface of the substrate 15 in the ABS side after polishing. The depressed degree ΔY10 is about 3 nm.

In supplying the current for writing to a magnetic disk driving device using the thin film magnetic head with the ABS profile shown in FIG. 4, the developed heat in the coil film 23 expands the insulating film 25, and thereby, expands the parts of ABSs 13 and 14 in the inductive type electromagnetic conversion element 2. Moreover, the developed heat expands thermally the first and the second magnetic films 21 and 22 adjacent to the insulating film 25, and thereby, protrudes the edge of the pole portion, not much strongly fixed, composed of the first and the second magnetic films 21 and 22 in the ABSs 13 and 14. In FIG. 4, the dashed line L11 designates the expansion curve.

A conventional thin film magnetic head sometimes have a large expansion degree ΔY11 of 10 nm because it can not discharge the developed heat in the coil film 23. Therefore, if a magnetic disk driving device using the conventional thin film magnetic head have a narrowed floating space of about 10 nm in between a magnetic disk and the thin film magnetic head, it may suffer from the crashes of the thin film magnetic head and the magnetic disk or the damage of the magnetically recorded data. It is a serious problem in the reliability of the magnetic disk driving device.

For ironing out the problem, this invention requires that the minimum thickness A on the second magnetic film 22 of the protection film 26 and the maximum thickness B in the inner gap of the insulating film 25 satisfy the relation of $1 \leq (A/B) \leq 2.5$. As a result, the expansion degree of the protection film 26 can be repressed to 3.0 nm or below, and even though the floating space is narrowed to 40 nm, 30 nm, 20 nm or 10 nm, the thin film magnetic head and the magnetic disk are not crashed and the magnetically recorded data are not damaged. It also develops the reliability of the magnetic disk driving device. Referring to FIGS. 5–10, explanation will be given concretely.

FIGS. 5–10 are simulation data showing the relation between the ratio (A/B) of the minimum thickness A of the protection film 26 to the maximum thickness B of the insulation film 25 and the maximum protrusion amount (nm). The maximum protrusion amount corresponds to the ΔY11 in FIG. 4. In simulation, a finite element method was employed. The physical constant of each material constituting each film in the thin film magnetic head was selected as follows:

TABLE 1

|  | Modulus of elasticity (Young's modulus): GPa | Thermal expansion coefficient: 1/K |
| --- | --- | --- |
| Substrate ($Al_2O_3$—TiC) | 420.0 | $7.9 \, e^{-6}$ |
| Magnetic film | 200.0 | $12.0 \, e^{-6}$ |
| Insulating film (Photo Resist) | 1.0 | $90.0 \, e^{-6}$ |
| Coil film (Cu) | 100.0 | $16.5 \, e^{-6}$ |
| Protection film ($Al_2O_3$) | 117.0 | $6.0 \, e^{-6}$ |

FIGS. 5–10 show the simulation data at the maximum thickness B=6 μm, 8 μm, 10 μm, 12 μm, 15 μm, and 20 μm, respectively. This range of the maximum thickness B embraces the thickness of the insulating film 25 which is able to be employed in a practical thin film magnetic head. In FIGS. 5–10, the maximum protrusion amount is less than 3 nm as far as the relation of $1 \leq (A/B) \leq 2.5$ is satisfied. If the ratio (A/B) is less than a value of 1, the maximum protrusion amount is increased remarkably. It is assumed that since the minimum thickness A of the protection film 26 become smaller, the protection film 26 can not stand up much against the thermal expansion of the insulation film 25 with the maximum thickness B of 6 μm. If the ratio (A/B) is more than a value of 2.5, the maximum protrusion amount is larger than 3 nm. It is presumed that the protection film 26 with too large minimum thickness A can not discharge the developed heat effectively.

According to the present invention, by selecting the minimum thickness A on the second magnetic film 22 of the protection film 26 and the maximum thickness B in the inner gap of the insulating film 25 appropriately, the thermal expansion of the protection film 26 at recording operation can be repressed absolutely without a specific manufacturing step. In addition, the thermal expansion of the edge of the pole portion can be repressed.

As mentioned above, the insulating film 25 may be composed of an organic insulating resin film or a ceramic film, preferably of $Al_2O_3$ film or $SiO_2$ film, etc. Since the ceramic insulating film has smaller thermal expansion than the organic resin insulating film, it can reduce the maximum protrusion amount.

Figure 11:
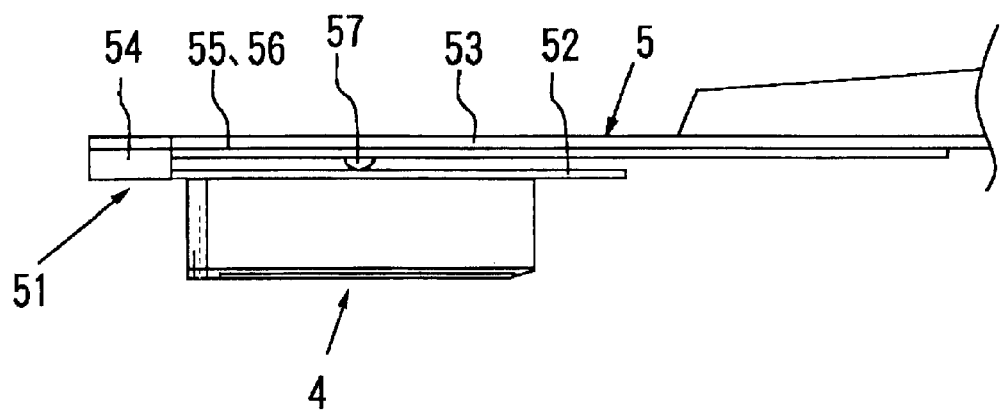
FIG. 11 is an elevational view showing a part of a magnetic head device according to the present invention.
Figure 12:
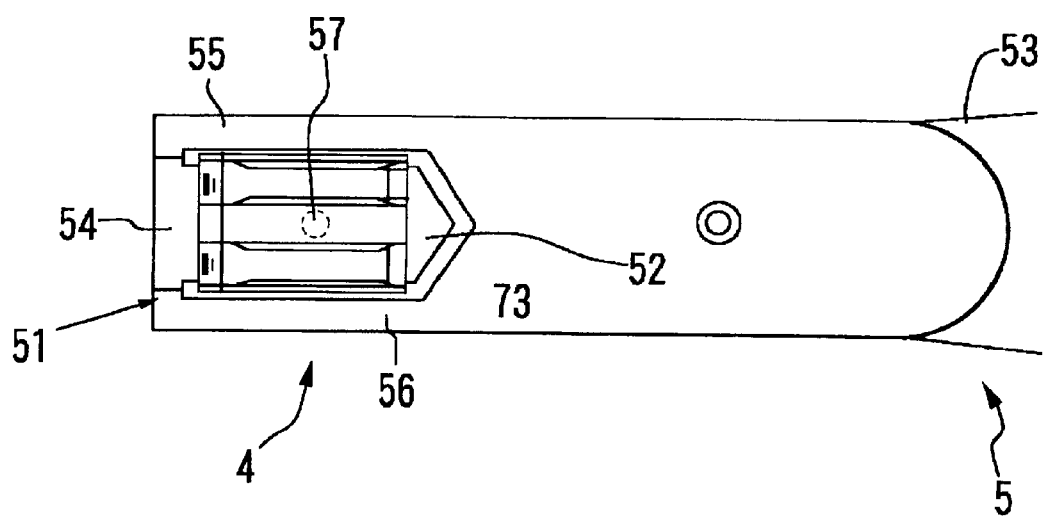
FIG. 12 is a bottom plan view of the magnetic head device shown in FIG. 11.

FIG. 11 is an elevational view showing a part of a magnetic head device according to the present invention, and FIG. 12 is a bottom plan view of the magnetic head device shown in FIG. 11. The magnetic head device has a head supporting apparatus 5 and a thin film magnetic head 4 according to the present invention similar to the ones in FIGS. 1–4.

The head supporting apparatus S is composed of a supporter 53 made of metallic plate and a flexibler 51 made of metallic plate provided on the free edge of the supporter 53 in its longitudinal direction. The thin film magnetic head 4 is attached on the lower surface of the flexibler 51.

The flexibler 51 has two outerframes 55 and 56 substantially parallel to the supporter 53 in its longitudinal direction, a lateral frame 54 to join the outerframes 55 and 56 in the remote portion thereof from the supporter 53, and a tongue shaped member 52, of which forefront is free, extending substantially parallel to the outerframes 55 and 56 from the almost central portion of the lateral frame 54.

On the almost central portion of the tongue shaped member 52 is provided a hemispheric loading convex portion 57 bulging on the supporter 53. The loading convex portion 57 conducts a load to the tongue shaped member 52 from the free edge of the supporter 53.

The thin film magnetic head 4 is attached to the lower surface of the tongue shaped member 52 by an adhesive agent, etc. Moreover, the thin film magnetic head 4 is so provided that its air outflow side can correspond to the longitudinal direction of the lateral frame 54. In this invention, any kind of head supporting apparatus may be employed, besides the above head supporting apparatus 5.

Figure 13:
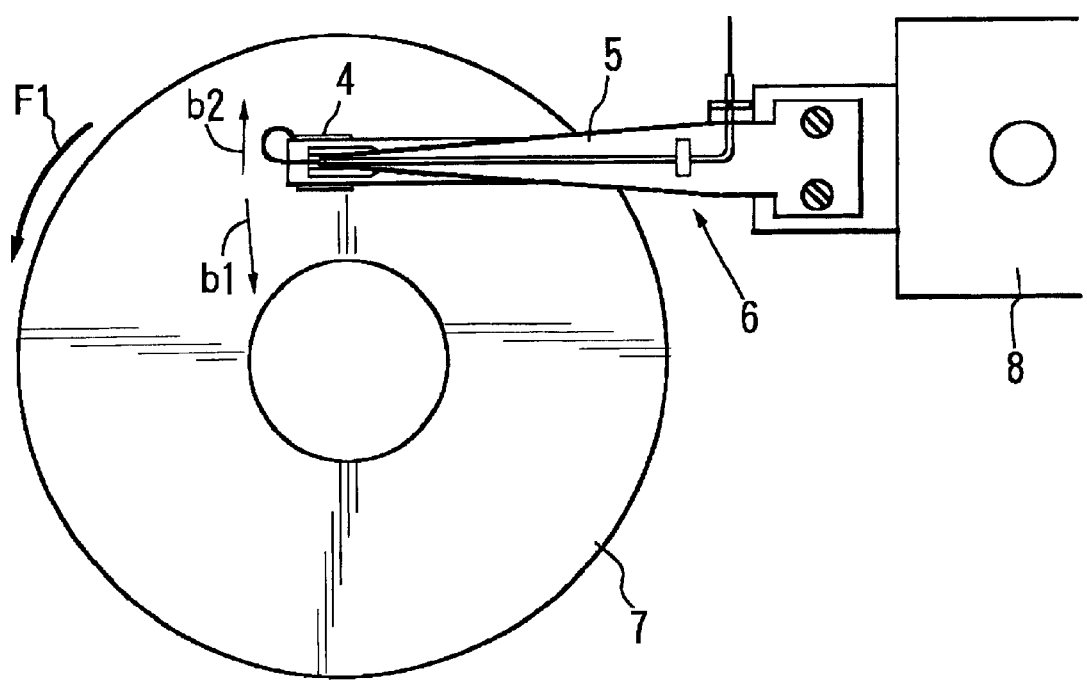
FIG. 13 is a plan view a magnetic recording/reproducing driving device according to the present invention.

FIG. 13 is a plan view showing a magnetic disk driving device according to the present invention. The magnetic disk driving device has a magnetic head device 6 and a magnetic disk 7. The magnetic head device 6 is similar to the one shown in FIGS. 11 and 12. The magnetic head device 6 is mounted on a position determining device 8 by supporting the one end of a head supporting apparatus 5 with the position determining device 8, and then, driven by the device 8. The thin film magnetic head 4 of the magnetic head device 6 is supported by the head supporting apparatus 5, and is positioned so as to oppose the magnetic recording surface of the magnetic disk 7.

When the magnetic disk 4 is rotated in the F1 arrow direction by not shown driving device, it floats on the magnetic disk 7 by a minute space. A rotary actuator system is generally employed as the driving system, but a linear actuator system may be done. In FIG. 13, the rotary actuator system is employed, and the thin film magnetic head 4 attached on the forefront of the head supporting apparatus 5 is moved in the radial direction b1 or b2 of the magnetic disk 7. Then, the thin film magnetic head 4 is positioned at a given track of the magnetic disk 7 by the position determining device 8 which rotates the head supporting apparatus 5.

Although the present invention was described in detail with reference to the above examples, this invention is not limited to the above disclosure and every kind of variation and modification may be made without departing from the scope of the present invention.

As mentioned above, this invention can provide the following effects:

(a) A thin film magnetic head in which the thermal expansion in the ABS due to the developed heat at a recording operation can be repressed can be provided.
(b) A thin film magnetic head in which the thermal expansion in the ABS due to the developed beat at a recording operation can be repressed absolutely without a special manufacturing step can be provided.
(c) A thin film magnetic head in which the thermal expansion of the edge of the pole portion as well as the protection film can be repressed absolutely can be provided.

What is claimed is:

1. A thin film magnetic head comprising a slider, at least one inductive type electromagnetic conversion element and a protection film, the inductive type electromagnetic conversion element including a first magnetic film, a second magnetic film, a gap film, a coil film and an insulating film which are supported by the slider, the forefronts of the first and the second magnetic films being opposed via the gap film in the air bearing surface side of the slider, and thereby, constituting a pole portion the first magnetic film being extended backward from the pole portion on the basis of the air bearing surface, the second magnetic film being extended backward from the pole portion with maintaining a given space for the first magnetic film, and being joined with the first magnetic film, the insulating film, on which the second magnetic film is formed, embedding the space in between the first and the second magnetic films, the coil film being embedded in the insulating film, and being wound spirally around the backward joined portion of the first and the second magnetic films, the protection film covering the at least one inductive type electromagnetic conversion element entirely, wherein the relation of "$1 \leq (A/B) \leq 2.5$" is satisfied, provided that the minimum thickness on the second magnetic film of the protection film is "A" and the maximum thickness in the space in between the first and the second magnetic films of the insulating film is "B".

2. A thin film magnetic head as defined in claim 1, wherein the insulating film is composed of a ceramic film.

3. A thin film magnetic head as defined in claim 2, wherein the ceramic film is a $Al_2O_3$ film or a $SiO_2$ film.

4. A thin film magnetic head as defined in claim 1, wherein at least one magnetoresistive effective element is included as a reading element.

5. A thin film magnetic head as defined in claim 4, wherein the magnetoresistive effective element has a spin valve film structure.

6. A thin film magnetic head as defined in claim 4, wherein the magnetoresistive effective element is composed of a ferromagnetic tunnel junction effective element.

7. A thin film magnetic head as defined in claim 4, wherein the magnetoresistive effective element is composed of a giant magnetoresistive effective element with a perovskite type magnetic substance.

8. A magnetic head device comprising a thin film magnetic head as defined claim 1 and a head supporting apparatus to support the thin film magnetic head.

9. A magnetic disk driving device comprising a magnetic head device as defined in claim 8 and a magnetic disk which is magnetically recorded and reproduced by the magnetic head device.

10. A thin film magnetic head as defined in claim 2, wherein at least one magnetoresistive effective element is included as a reading element.

11. A thin film magnetic head as defined in claim 3, wherein at least one magnetoresistive effective element is included as a reading element.

12. A magnetic head device comprising a thin film magnetic head as defined in claim 2 and a head supporting apparatus to support the thin film magnetic head.

13. A magnetic head device comprising a thin film magnetic head as defined in claim 3 and a head supporting apparatus to support the thin film magnetic head.

14. A magnetic head device comprising a thin film magnetic head as defined in claim 4 and a head supporting apparatus to support the thin film magnetic head.

15. A magnetic head device comprising a thin film magnetic head as defined in claim 5 and a head supporting apparatus to support the thin film magnetic head.

16. A magnetic head device comprising a thin film magnetic head as defined in claim 6 and a head supporting apparatus to support the thin film magnetic head.

17. A magnetic head device comprising a thin film magnetic head as defined in claim 7 and a head supporting apparatus to support the thin film magnetic head.

* * * * *

UNITED STATES PATENT AND TRADEMARK OFFICE
CERTIFICATE OF CORRECTION

PATENT NO.    : 6,366,428 B1
DATED         : April 2, 2002
INVENTOR(S)   : Yamanaka et al.

It is certified that error appears in the above-identified patent and that said Letters Patent is hereby corrected as shown below:

<u>Title page,</u>
Item [*] Notice, delete the phrase "by 0 days" and insert -- by 74 days --

Signed and Sealed this

Ninth Day of November, 2004

JON W. DUDAS
*Director of the United States Patent and Trademark Office*